United States Patent [19]

Seaman et al.

[11] Patent Number: 5,225,230

[45] Date of Patent: Jul. 6, 1993

[54] METHOD FOR PREPARING A HIGH BYPASS PROTEIN PRODUCT

[75] Inventors: Donald W. Seaman, Ralston; William D. Stidham, Glidden, both of Iowa

[73] Assignee: West Central Cooperative, Ralston, Iowa

[21] Appl. No.: 760,939

[22] Filed: Sep. 17, 1991

[51] Int. Cl.⁵ .............................................. A23J 1/14
[52] U.S. Cl. ..................................... 426/634; 426/656
[58] Field of Search ............. 426/634, 417, 623, 635, 426/656

[56] References Cited

U.S. PATENT DOCUMENTS

| | | |
|---|---|---|
| 4,035,194 | 7/1977 | Grassl ................................ 426/634 |
| 4,137,339 | 1/1979 | Kudo ................................. 426/634 |
| 4,728,522 | 3/1988 | Wear ................................. 426/634 |
| 4,791,001 | 12/1988 | Matsuura ........................... 426/634 |
| 4,828,869 | 5/1989 | Doi .................................... 426/634 |
| 4,857,357 | 8/1989 | Ammann ............................ 426/634 |
| 4,874,555 | 10/1989 | Upchurch .......................... 426/634 |
| 4,992,294 | 2/1991 | Noguchi ............................ 426/634 |
| 5,068,117 | 11/1991 | McCabe ............................. 426/634 |

*Primary Examiner*—Carolyn Paden
*Attorney, Agent, or Firm*—Fay, Sharpe, Beall, Fagan, Minnich & McKee

[57] ABSTRACT

A high bypass protein product as prepared from soybeans. The soybeans are comminuted sufficiently to crack open their hulls. The comminuted soybeans are then heated at elevated temperatures in the range of about 235-350° F., and maintained at these elevated temperatures for about 1-60 minutes. Oil is then partially removed from the soybeans to leave a cake which is then processed as feed for livestock. The resulting feed has a protein bypass value in the range of 55-65%, and quantities of essential amino acids lysine and methionine are bypassed at the rate of at least 8.0 grams per pound of feed ingested by the livestock.

12 Claims, 2 Drawing Sheets

METHOD FOR PREPARING A HIGH BYPASS PROTEIN PRODUCT

BACKGROUND OF THE INVENTION

This invention relates to the art of preparing a high by-pass protein animal feed product from partially de-oiled soybeans. This high quality animal feed product is particularly suitable for feeding dairy cattle.

Since the end of World War II, soybeans have become a major agricultural commodity in the United States and in many other parts of the world. Each metric ton of soybeans typically contains around 183 kg. of oil and around 800 kg. of meal.

In "Soybean Utilization", Snyder, H. E. and Kwon, T. W., AVI Book, Van Nostrand Reinhold Company, 1987, the authors show that in the years 1980–1984 the average production of soybeans was on the order of 52 million metric tons in the United States as compared to an average world production of 85 million metric tons. World production of soybean oil for 1984/1985 was 13.3 million metric tons.

Early in 1990 (Inform, Vol. 1, No. 2 (February 1990)) it was predicted that world soybean production would increase to 107 million metric tons. The world's soybean crush was estimated to reach 88 million metric tons, showing again that a very large percentage of soybeans produced are converted into oil and meal. For the same period, soybean oil production in the United States was predicted to be 6.4 million metric tons, implying meal production of 30 million metric tons and thus a domestic soybean production of well in excess of 36.4 million metric tons.

To put the United States production in economic perspective, recent data (The Wall Street Journal, Jan. 5, 1991) listed cash prices for soybean commodities as follows:

soybeans: $5.50-½ bushel ($201.85/metric ton);
soybean oil: $0.2083/lb ($458.26 metric ton) and
soybean meal: $150 to $156/ton or $165 to $171.60/metric ton.

The production of soybean oil and meal in any given year is of vast importance to the domestic and worldwide economy as it involves many billions of dollars, worth of products. Important products include soybean oil, which is used in the United States and elsewhere throughout the world as a vegetable oil for human consumption, and soybean meal. Soybean meal is ultimately used as a component for animal feed mixtures. It is high in protein, and the constituent amino acids are used by an animal's body as building blocks for its own proteins. These proteins are, in turn, the major building blocks of the animal's muscle structures and organ tissues.

The rumen functions to digest the difficult-to-digest materials eaten by cattle. Such materials include feeds and grass fibers. The fluids and bacteria present in the rumen attack cellulose as well as proteins. The proteins comprise a high content of nitrogen, roughly 15 to 18% by weight. The rumen bacteria breaks down the protein into various products, some of which are gaseous in nature such as gaseous amines, ammonia or methane. These gaseous products are generally lost to the nutrition of the animal. Soybean meal processed according to conventional solvent extraction methods typically produces substantial quantities of gaseous products.

If untreated or raw soybeans were to be fed to a cow, the proteins present in the soybeans would be rapidly broken down in the cow's rumen, a component of a cow's digestive system. The protein, in its untreated form, is highly soluble and readily breaks down in the rumen fluids. The protein diffuses through the membrane wall of the bacteria which converts it to amines, methane and ammonia. This permits the bacteria to maintain its own life and allows it to produce energy for its own multiplication. Relatively little protein is able to pass through the rumen and into the abomasum, the second part of the digestive system of the ruminant animal.

It is desirable to develop a protein which can significantly bypass the rumen and move into the abomasum which bleeds the protein to the small intestine, the third and final part of the ruminant animal's digestive system. From there, the amino acids are put into the bloodstream and resynthesized into constituents such as muscle tissue or milk protein.

In view of the highly soluble nature of soybean proteins or any other feed proteins, their conversion for use by the animal body is generally not efficient. That is, an excess of soybean proteins is needed to produce a given quantity of animal protein, whether in the form of animal tissue, protein in milk, or both. The efficiency of the conversion process depends upon numerous factors including species, age and condition of the animal, as well as the properties of the feed itself.

The proteins used in dairy nutrition are composed of amino acids, several of which are considered essential amino acids. Essential amino acids are those amino acids which the animal body is unable to synthesize itself and, therefore, must be supplied from an extraneous source, i.e., the feed. Typical examples of essential amino acids required by cows and cattle include lysine and methionine. Absorption of essential amino acids by the animal body is vital for muscle maintenance, muscle growth, reproduction and, in the case of dairy cattle, lactation.

There are two sources of essential amino acids in the ingested feed. First, there is the microbial protein produced in rumen fermentation by microorganisms in the rumen, the largest compartment of the multi-compartment stomach of the cow. The second source is the dietary protein that escapes (or bypasses) rumen fermentation ("bypass protein").

As a cow's milk production increases, the protein produced in rumen fermentation is unable to supply all the amino acids necessary for maximum growth or milk production of dairy cattle. A substantial portion of amino acids is derived from protein which bypasses the rumen and passes into the small intestine where digestion and absorption of these amino acids occur. Since this partitioning of the amino acid absorption increases the overall utilization of the protein in the feed, it may be stated that protein efficiency is increased when protein escapes fermentation in the rumen.

The cost of feeding dairy cattle is primarily determined by the cost of protein. Thus, by improving protein efficiency, less protein is needed for a given production of animal protein, whether in the form of maintenance, growth or production of milk. The cost of feeding is thereby reduced.

A maximization of lactation performance (i.e., milk production) in dairy cows calls for formulating feed rations to contain optimum levels of bypass or escape protein, utilizing high quality protein sources.

The term "protein quality" is used to describe the amino acid balance of the protein relevant to feeding a specific animal. A high quality protein is one that supplies a high level of essential amino acids in the proportions and amounts needed by a specific cow. Soybean meal is considered to be a high quality protein for feeding dairy cattle.

Soybeans may be fed to dairy cattle in several distinctive forms. Each distinctive from has its own particular usefulness as a dairy feed supplement.

Raw soybeans are the commodity harvested on the farm and subsequently dried for storage and/or further processing. This commodity typically contains 70% solids, 18-20% oil and 10-12% moisture.

In preparing soybean meal from raw soybean, a number of processes or methods are known in the art. Conventional soybean meal is available in a variety of forms or types prepared according to various methods.

One form of conventional soybean meal comprises full fat soybean meal. This is a meal prepared by grinding soybeans without any removal of the lipid component of the soybean.

A second type of conventional soybean meal is solvent soybean meal. This is a meal produced by solvent extraction of soybeans. It comprises 1% or less residual oil. By far, the largest quantity of soybean meal available in the marketplace is of this origin.

A third form of conventional soybean meal is expeller soybean meal. This is a meal prepared by conditioning comminuted soybeans and subsequently mechanically extracting a substantial part of the oil content of the beans. Mechanical extraction is best performed using a screw press, i.e., a piece of equipment generally referred to as an expeller (hence the appellation "expeller" soybean meal). This meal generally contains 4 to 8% residual oil on a bone-dry basis (i.e., when samples are dried first to a low (generally less than 0.2%) moisture content).

The bypass protein value of full fat soybean meal is relatively low, approximately 35% based on current analysis. However, only limited quantities of full fat soybeans can be added to feed rations, due to the fact that the high oil content may be a causative factor in some digestive disturbances. Too large a quantity of fat in feed upsets the rumen bacteria, and much of the protein in the feed is not converted to animal muscle or milk. Similarly, the bypass protein value of solvent soybean meal is low, i.e., about 35%.

Production of expeller soybean meal is limited and, based upon samples measured from various small production sources in the United States, its quality in terms of bypass value and residual oil content is quite variable.

There are other disadvantages to the production of expeller soybean meal. For instance, during the process, seeds are comminuted and heated to remove moisture and partially insolubilize protein. The oil is then pressed out at relatively high temperatures, about 200-210° F. This temperature provides a problem with pressing and produces a poorer quality oil. Though the expeller meal protein is partially insolubilized, its bypass value is relatively low.

Table I below shows typical bypass protein levels of selected soybean products:

TABLE I*

| Soybean Product | Protein % Bypass |
|---|---|
| Extruded meal, full-fat meal | 35 |
| Whole soybeans | 26 |
| Soybean meal, solvent extracted | 35 |
| Soybean meal, unheated | 14 |
| Soybean meal, dried at 120° C. (248° F.) | 59 |

*Extracted from TABLE 11-1. Bypass Protein (percent of undegraded protein) in common feeds. Feeds & Nutrition, Ensminger et al., 1990 and National Research Council. Report on Nutrient Requirements of Dairy Cattle, 6th Edition, 1988.

As stated earlier, a further measure of protein quality is the availability of the essential amino acids lysine and methionine. Since the known techniques for increasing protein bypass value generally involve the application of heat and/or chemicals to the soybean proteins, these conventional processes show damage to the heat labile amino acids. They are broken down so as not to be useful to the animal, and are known in the art as having a reduced availability of essential amino acids. Also, the resulting feed often becomes unpalatable.

There is a need and desire to develop a method for treating soybeans such that the resulting meal is undamaged and has an improved protein bypass value. Such a method would produce a feed offering increased lactation in dairy cows and improved muscle structure in cattle. Such a method should further produce a soybean meal having low protein degradability in the rumen, hence a high rumen bypass value. Such a method should be economical and should provide a resulting cost effective feed.

The prior art consists of many techniques in which heat is applied to soybean proteins in the presence of chemicals to produce products with high bypass values. Many of the products described in the prior art are not commercially available and have not been commercially successful because of high cost of production, palatability problems, reduced availability of essential amino acids, and the like.

The present invention contemplates a new and improved method for preparing a high quality bypass protein product with a high availability of essential amino acids from soybean proteins.

BRIEF SUMMARY OF THE INVENTION

In accordance with the present invention, there is provided a method and assembly for preparing a high bypass protein feed from soybeans. The soybeans are not chemically treated. Rather, they are treated physically and subjected to high temperatures.

Soybean material is comminuted to a particle size suitable for the physical and chemical reactions of the subsequent steps. During this comminution step, the hulls of the soybeans are cracked, making it possible to remove a smaller or larger fraction of the hulls for the purpose of adjusting the weight percentage of protein in the final product. Generally, however, when preparing feed for cattle, the hulls are not removed in this step. If they are removed, ground hull material is added to the final product to achieve an end product containing a standard amount of approximately 42% or 44% protein by weight.

Next, the protein within the comminuted soybean particles is reacted at a high temperature to form highly insoluble complexes which are significantly resistant to rumen bacteria and have a high bypass value. The reaction of the proteins to form these complexes takes place at temperatures substantially in excess of temperatures normally used to process soybeans for either the extraction of soybean oil and/or the preparation of feed products for cattle.

Depending upon the temperature selected for the reaction, and upon the initial moisture present in the soybean particles fed to this step, it is advantageous to operate the reactor in a manner to allow for a shorter or longer retention time of the particles in the reactor. Generally, in accordance with the laws of chemical kinetics, the higher the temperature, the shorter the retention time required to produce the high bypass quality of the proteins that is desirable.

A third step in the present invention is the partial removal of the soybean oil from the particles of high bypass protein feed produced during the high-temperature reaction step. This sharply reduced oil content allows for formulating dairy cattle rations containing higher percentages of the bypass protein product, because the lesser content of residual oil reduces impairment of the digestive processes in the rumen.

A benefit of the present invention is that by reacting the soybean protein at an elevated temperature, the moisture in the soybeans may be reduced to levels which improve partial oil removal in the subsequent removal step.

Another benefit of the subject invention is that the short-time high-temperature exposure of the soybeans in the reactor is such that the nutritive quality of the proteins is substantially unimpaired. Specifically, the essential amino acids lysine and methionine are bypassed through the rumen without impairment common to conventional methods. The resulting soybean meal is quite palatable and will be readily ingested by the animals for which it is intended.

Another benefit of the subject invention is that the combination of elevated temperatures and short retention times needed to produce a superior high bypass protein minimally affects the quality of the oil in the soybean particles. Moreover, the method does not require the addition of chemicals to insolubilize the protein. Thus, in the subsequent partial oil removal step, a better quality by-product, i.e., crude soybean oil, is produced. This enhances the economic value of the present invention. Also, the better quality oil remaining in the high bypass feed particles is better utilized by the ruminant digestive system, thereby further enhancing the quality of the feed.

Yet another benefit of the present invention is that the combinations of elevated temperatures and short retention times allows for the selection of more desirable equipment. The equipment is both more compact and less capital cost-intensive as compared to the equipment required for the heating and drying steps typically employed in the preparation of the lower quality high bypass products representative of the state-of-the-art.

Still other benefits and advantages of the present invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof.

DETAILED DESCRIPTION OF THE INVENTION

Figure 1:
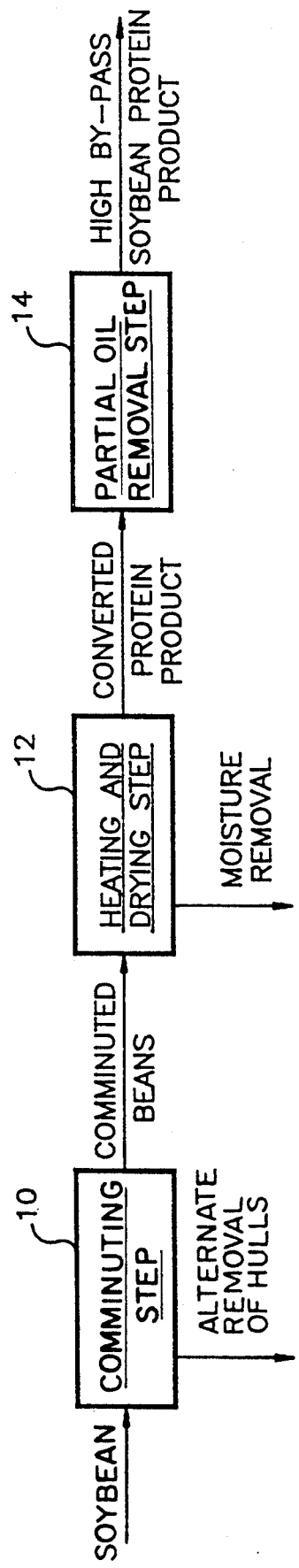
FIG. 1 is a block diagram illustrating the steps in the practice of the present invention for converting soybeans into a high-bypass protein feed for dairy cattle.

Referring now to the drawings wherein the showings are for purposes of illustrating the preferred embodiment of the invention only and not for purposes of limiting same, FIG. 1 is a block diagram showing the steps followed in practicing the present invention. In particular, FIG. 1 sets forth the steps of comminuting soybeans, heating and drying the comminuted soybeans, and removing oil therefrom.

A first block 10 shows a comminuting step in which soybeans from a storage source are comminuted to a desired particle size range. A practical range is from smaller than 200 mesh to as large as approximately one-eighth of an inch in average diameter. This step may be practiced with or without removal of the hulls. The stored soybeans typically have a moisture content of 10–12% prior to being subjected to the comminuting step.

A second block 12 in FIG. 1 represents a high-temperature heating step. At this point, the comminuted soybeans are heated at elevated temperatures in the range of about 235–350° F., and maintained at these elevated temperatures for about 1–60 minutes. Since the process of heating the soybeans causes the soybeans to lose moisture, i.e., to dry, this step is referred to as a "heating and drying" step. The primary objective of this step, however, is to convert the protein in the soybeans to high bypass protein. A corollary objective is to convert the protein in such a manner that essential amino acids (lysine, methionine) remain available in the product.

A third step represented as 14 on FIG. 1 is the partial removal of oil to render the product into one having a lower residual oil so the product is more digestible for livestock. The resulting feed has a protein bypass value in the range of 55–65%, and quantities of essential amino acids are bypassed at the rate of at least 8.0 grams per pound of feed ingested by livestock.

Figure 2:
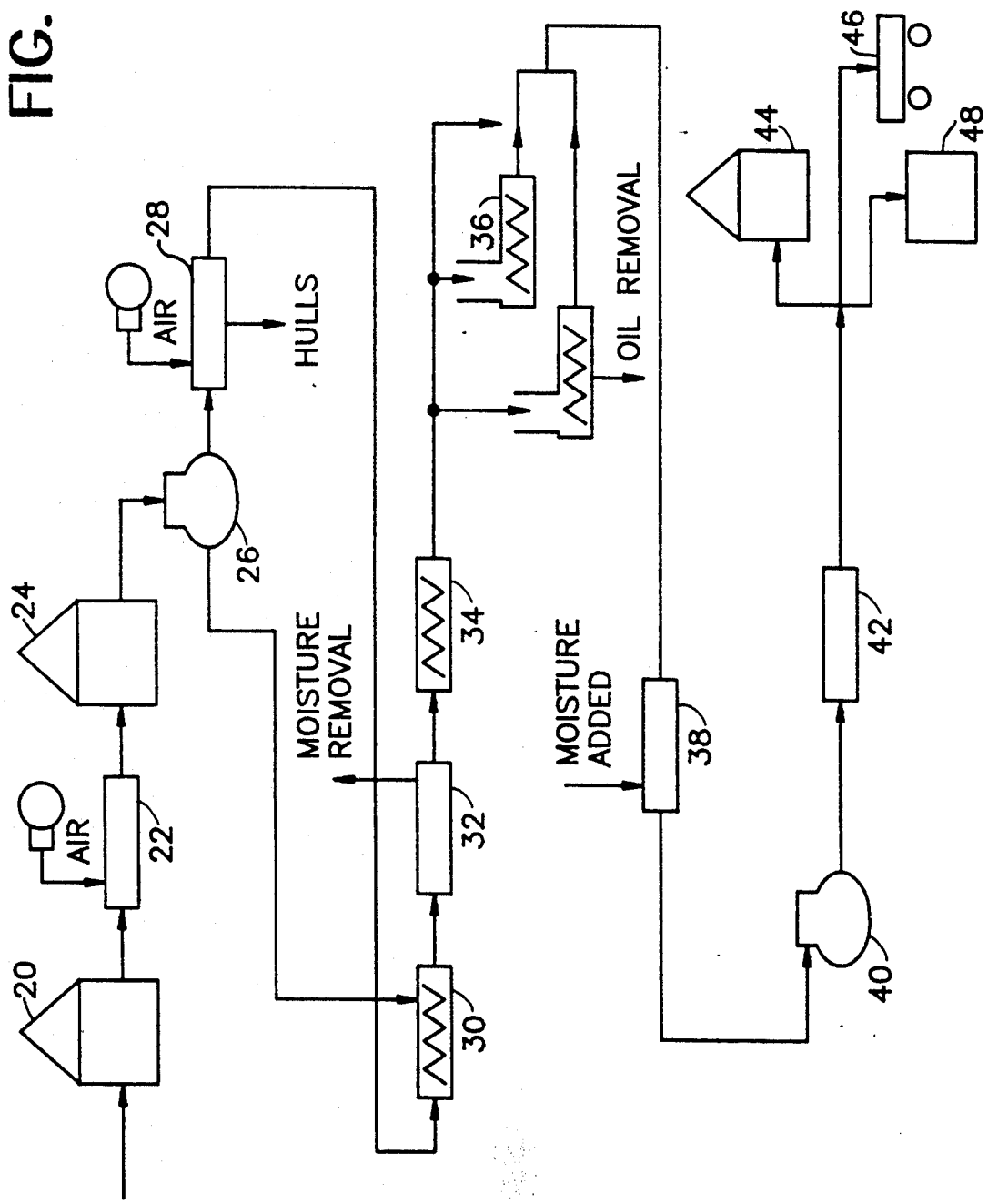
FIG. 2 is a schematic diagram of a plant constructed in accordance with the present invention for converting soybeans into a high-bypass protein feed for dairy cattle.

Turning now to FIG. 2, a schematic representation of a plant constructed in accordance with the present invention is shown. Harvested soybeans are delivered to a processing plant and directed to a receiving or holding tank 20. The beans can be fed initially to a variety of equipment such as, but not limited to, materials handling equipment for leading beans to a conveyor, or directly to cleaning equipment.

The beans are cleaned using cleaning equipment 22. Typical cleaning equipment for soybeans, referred to as "cleaners" in the trade, may be obtained from companies such as Prater Industries, Inc., Rotex Inc., Triple/S Dynamics, Inc. or others. In the cleaning step, there is a loss associated with removal of dirt, twigs, and other items. As a result, if material flow into the plant is at 220 tons/day, a material flow of cleaned soybeans exiting the cleaning equipment will be less than 220 tons/day. Feed mills and vegetable oil extraction plants are typically rated by the amount of raw material fed to the plant while meeting certain standards with respect to moisture content, dirt content, insect residue, etc.

After they have been cleaned, the soybeans may be stored in a storage bin 24, or other appropriate receptacle, and held for processing at a later date. Alternatively, the cleaned soybeans may be transmitted directly from storage bin 24 for further processing. The soybeans in storage have been dried to a typical moisture content of about 10 to 12% by weight.

Beans may be stored for years provided that they are protected against infestation and moisture. As long as the moisture content of the beans is about 13%, degradation by bacteria and molds will not occur. There may be some degradation in the resulting oil quality as time progresses.

Next, the soybeans are transferred to comminuting equipment 26. Here, the soybeans are comminuted using equipment commonly used for these purposes and known to those skilled in the art of soybean processing. Examples of such comminuting equipment are cracking rolls and hammer mills.

Optionally, a subsequent step may comprise dehulling to remove a smaller or larger portion of the hulls. If it is desired to dehull or partially dehull the soybeans, the comminuted soybeans are transferred to hull removal equipment 28 which causes air to flow through and dislodge and carry away the hulls. However, in the preparation of feed for dairy cattle, if any hulls are removed at this point, they are added and mixed back in with the final product. For the preparation of dairy feeds, there is a consideration for removing the hulls at this point. The hulls are highly abrasive, and it may be desirable to remove them prior to the subsequent step of partially removing the oil.

Subsequent to the comminuting and, if employed, dehulling steps, the comminuted soybeans are conducted by means of conveyor 30 to the high temperature reactor 32. The physical form of this step must be conducive to heating and maintaining the soybean particles at a temperature range of roughly 235-350° F. for a period of between about 60 minutes and approximately one (1) minute in order to produce the protein conversion reactions which result in the high protein bypass values of the products prepared in accordance with the process of the present invention. A more preferable temperature range for this reaction is between about 250° and 350° F., while the most desirable range is between about 280° F. and 290° F. Likewise, a more preferable period of exposure is between 40 minutes and 5 minutes, with a typical retention time falling in the range of about 30 down to 20 minutes.

Soybeans heated at high temperature produce a feed having favorable bypass values. Examples of bypass value taken with corresponding drying temperatures of soybean meal are set forth in Table II:

TABLE II*

| Soybean Meal Drying Temperature | Percentage Bypass |
| --- | --- |
| 120° C. | 59% |
| 130° C. | 71% |
| 140° C. | 82% |

*Feedstuffs, page 66, 1991 Reference issue.

The retention time is inversely proportional to the temperature. The lower temperatures correspond to the longer retention times, and the higher temperatures correspond to shorter retention times.

An example of high temperature reactors which may be used include directly heated or indirectly heated rotary kilns such as those supplied by The Davenport Company, Davenport, Iowa; Renneburg, Baltimore, Md.; or The Heil Company, Milwaukee, Wis. Other types of high temperature reactors which may be used include disc heaters or conveyor heaters with heated screws or troughs (the latter commonly referred to in the trade as "Schnecken") as supplied by The Dupps Company, Germantown, Ohio; Bepex Corporation, Minneapolis, Minn.; or Bethlehem Corporation, Bethlehem, Pa. Finally, ring heaters or jet heaters with direct or indirect heating such as supplied by The Dupps Company, Germantown, Ohio; Alljet, Plumsteadville, Pa. may be used. Of course, other types of high temperature reactors may be incorporated into the present invention and will be known to those skilled in the art.

Rotary kilns may be used as heating equipment. Such kilns have dams or metal plates used to control the level of material in the kiln. The dams are set in accordance with the rate of feed to the plant. A high dam setting provides for a relatively large volume of material obtained in the kiln and long retention time, and a low dam setting provides for a relatively small volume of material in the kiln and short retention time.

Many of the types of equipment referred to above in connection with high-temperature reactors are often referenced as "dryers" in the trade. In conventional soybean processing, dryers are used to remove moisture from the soybeans. Typically, however, the dryers are only heated to temperatures in the range of between 200° F. and 220° F.

In the new art of the present invention, this "drying" equipment is used in an unconventional manner for soybeans, namely, as a high temperature reactor for the conversion of soybean protein in the high bypass form, i.e., a form which is highly inert to rumen degradation. As the soybean particle is heated to a high temperature and maintained at that temperature, moisture escapes and the particle dries. This is only a corollary benefit, however, as the primary benefit is the conversion of the proteins to high bypass proteins.

Tests performed with soybean particles in a steam heated rotary kiln are shown in Table III.

TABLE III

| Process | Primary Purpose | Temp/ Retention Time | Protein % Bypass |
| --- | --- | --- | --- |
| State-of-the-art | Drying/Heating | 220° F./40 min | 30 |
| State-of-the-art | Drying/Heating | 220° F./60 min | 35 |
| Present invention | Reacting | 250° F./40 min | 50 |
| Present invention | Reacting | 290° F./20 min | 60 |

The soybeans are subjected to temperatures in the range of about 250-350° F., preferably between about 280-290° F.

The soybean particles discharged from the high temperature reactor 32 are conducted by means of a discharge conveyor system 34 to one or more pieces of equipment such as a screw press 36 suited for the partial removal of soybean oil from the soybean particles. The conveyor system 34 may be heated if the distance between the high temperature reacting step and the hull removal step is such that a significant drop in temperature may occur.

Suitable equipment 36 for partial removal of soybean oil from the soybean particles includes equipment commonly used in conventional soybean processing for this same purpose. This equipment is generally denoted as a screw press in the trade, and is supplied by The Dupps Company, Germantown, Ohio or Anderson International, Cleveland, Ohio. In the screw press, a rotating screw in a slotted barrel creates a pressure on the soybean particle mass being conveyed through the barrel. This causes the oil to separate from the particles and to escape through slots in the barrel. A back pressure of the mass or soybeans in the step of partially removing the oil ranges from about 50 to 300 PSIG.

The partially de-oiled soybean particles are agglomerated in the screw press and discharged from the screw press as ribbons or strips of densified soybean material, or soybean press cake. This cake generally contains approximately 5% to 5.5% residual oil by weight on a moisture-free basis.

In conventional soybean processing specifically for the purpose of extraction of soybean oil, there is a slight increase of the protein bypass value of the cake due to the frictional heating caused by the mastication of the soybean mass as it is conveyed through the barrel. In conventional soybean processing, there is a moderate heating and drying step resulting in maximum feed temperatures to the press of 220° F. or less. The subsequent heating of soybean mass in the barrel causes a temperature increase to approximately 250° F. at the discharge of the barrel. The mass, however, is exposed to this temperature for a very short period of time, on the order of a few seconds. Under these conditions, the soybean press cake shows a slight increase in bypass value as compared to the bypass value of the conventionally treated feed material.

In the method of the present invention, the material fed to the press 36 is already at a bypass value in the range of roughly 55-65%, exceeding that possible with heating through mastication in the barrel alone. Thus, the conditions of the screw press can be selected for optimum removal of oil from the soybean particles, rather than for generating heat and temperature as in the conventional process. Table IV shows some of the significant differences between the conventional processes and the method of the present invention.

TABLE IV

| Process | Pretreatment Step | Bypass Value of Feed, % | Bypass Value of Discharge, % |
|---|---|---|---|
| Conventional | Heating/Drying 220° F. or less, 2% moisture | 20-30 | 30-35 |
| Present Invention | Reacting 250-350° F., 2-3% moisture | 55-65 | 55-65 |

The first column in Table IV lists the type of process being analyzed. Here, the conventional expeller process is compared to the process of the present invention.

The second column describes the step followed. In the conventional expeller process, the soybeans are "dried" by heating them to temperatures as high as 220° F. The objective of such a step is to dry the beans. The step described and associated with the present invention is that of reacting at temperatures in the range of 250-350° F.

The third and fourth columns compare the bypass protein value associated with the soybeans being fed to the pressing step of the second column, and the bypass value associate with the soybeans exiting from the pressing step, taking into account the type of pretreatment step they were subjected to. As will be noted, the bypass protein value for the conventional process increased from a range of 20-30% to a range of 30-35%. The bypass protein value of the present invention remained at 55-65% before and after the pressing step, showing that the bypass value is achieved in the high-temperature reactor and not affected by the press.

A corollary advantage of the high temperature reaction step of the present invention is that because of the high temperature applied to the soybean particle, drying proceeds very rapidly, and damage to the availability of the essential amino acids is much less than that in any of the conventional processes. Based upon comparative data on bypassed protein prepared by this invention and that of conventional processes, essential amino acids lysine and methionine are bypassed through the rumen at the rate of at least about 8.0 grams per each pound of soybean meal produced in accordance with the present invention and ingested by the livestock. Typically, however, the rate is between about 8.0 and 8.7 grams per pound of meal ingested by the animal.

Table V shows a comparison of bypassed lysine and methionine per pound of feed ingredient:

TABLE V

| Product | Grams of Bypassed Lysine and Methionine |
|---|---|
| 1. Soybean meal, solvent | 5.56 |
| 2. Whole soybeans | 3.20 |
| 3. Product of present invention | 8.40 |

The phrase "solvent meal, solvent" refers to meal prepared according to a solvent extraction process. "Whole soybeans" refers to soybeans that have not been subjected to any chemical processor or to heating, with the exception of any heating conducted during the drying process. As stated earlier, harvested soybeans are typically dried to moisture levels no higher than 13% moisture. In the instance where raw soybeans are used as feed, it is likely that they've been at least comminuted to assist in the digestion process.

While the partial oil removal step which occurs at 36 has been practiced with screw presses manufactured by Anderson International, Cleveland, Ohio and by The Dupps Company, Germantown, Ohio, it has been found that the screw press manufactured by The Dupps Company had an important advantage with respect to other presses such as the Anderson presses. Its automatically controlled discharge valve consists of a conical part which may be positioned in the conical discharge flange of the press barrel by means of a hydraulic ram. By setting the hydraulic pressure back, pressure on the soybean matrix moving through the press can be controlled. Thus, by setting this hydraulic pressure, the equipment represented by 20, 22, 24, 26, 28, 30, 32, 34, and 36 can be controlled to produce a high bypass protein product with a suitably low residual oil value.

Multiple presses may be used at this step. The decision of how many presses to operate is based upon a number of factors including a) an amount of product desired for a particular day, and/or b) maintenance and repair considerations.

Subsequent to the partial oil removal step, the cake discharging from the screw presses is conducted through a discharge conveyor system 38 (which has means for adding moisture to the cake) to a grinder 40 wherein the press cake is ground to a desired range of particle sizes, generally about 40 mesh to 80 mesh).

While there is some cooling in the conveyor system 38 and the grinder 40, the resulting granulate is at too high a temperature for safe storage. If the temperature is too high, fire and explosions involving hot granulate dust may occur. Generally, any temperature in excess of 150° F. is considered excessive. Accordingly, the granulate is air-cooled to 150° F. or less in cooler 42 prior to conducting it to storage bins 44.

The storage bins are designed to protect the product from insect infestation and moisture. As long as the moisture level is maintained in the range of no greater than 10–13%, mold, bacterial and enzymatic activity will be negligible. Finished feed products are typically adjusted to a predetermined moisture level to provide for environmental stability, improved flowability, improved palatability and reduced dust inhalation by the animal. The moisture further serves to prevent excessive dusting under handling conditions, and to reduce electrostatic charges thereby reducing explosion and fire hazard.

Subsequent to the cooling the granulate at 42, the product may be conducted to storage 44, bulk loading 46 or bagging equipment 48.

It is to be understood that there may be a reduction in flow to the various steps of the process set forth herein. That is, losses and material diversions occur as a result of cleaning from the cleaning step, and water loss from the high temperature reacting step. There may be as much as a 20% reduction in material from the feed step to the oil extraction. For example, if it is stated that feed to the press is approximately 16 tons/day, prorated to what was fed to the plant, by the time it hits the press there may be a shrinkage of up to 20% due to cleaning and water removal. As such, the mass flow of what is said to be 16 tons/day may actually comprise approximately 13 tons/day of cleaned, high-temperature treated, dried beans.

The invention is further illustrated by the following specific non-limiting example.

EXAMPLE

An existing, conventional expeller soybean pressing plant was modified in accordance with the techniques of this invention.

An indirectly-heated rotary kiln manufactured by The Davenport Company, Davenport, Iowa was installed to provide the high temperature heating step provided for by this invention. Raw soybeans were fed to the plant at a rate of roughly 220 tons/day.

The rotary kiln has changeable dam setting and is provided with temperature controls. The temperature of materials discharged from the kiln was controlled to around 290°F. ± 5° F. The dam settings (i.e., the settings of adjustable metal plates used to control the soybean level within the kiln) were adjusted such that at a rate of 250 tons/day of feed to the plant, retention of the comminuted soybeans in the kiln was roughly 20 minutes ± 2 minutes.

The comminuted and heated soybeans were typically dried from about 10–12% initial moisture to about 2 to 3% final moisture upon discharge from the rotary kiln. The heated beans were conducted from the kiln to a bank of screw presses operating in parallel. The bank of screw presses consisted of:

a) Thirteen (13) Anderson Duo 33 expeller presses operating at shaft speeds of 20 to 30 RPM. At any given time not all of these presses would be operated; and b) One (1) Dupps 10 Pressor screw press with a specially modified shaft to accommodate a feed consisting of hot beans from the rotary kiln. Shaft speed of this screw press was 22 RPM. This press was operated with an automatic choke pressure of 200 psi to maintain a corresponding internal pressure on the mass of comminuted beans as it passed through the press.

The average discharge rate from each of the Anderson presses was 12 tons/day of cake, corresponding to approximately 16 tons/day fed to the plant. Discharge temperature of the cake was approximately 275° to 290° F. Average residual oil content measured as a composite of all Anderson presses was 4.5% after the cake was adjusted from approximately 2–3% initial moisture (typically somewhat lower than the moisture in the discharge product from the rotary kiln) to 12% moisture.

The discharge temperature of press cake from the Dupps press was typically about 280–320° F. and at an average rate of roughly 35 tons/day of cake or 44 tons/day of soybeans fed to the mill. Product from this press also showed 2 to 3% moisture, marginally lower as compared to the product also showed a 4.5% residual oil content.

The major part of the discharge of the presses is in the form of strips, ⅛" to ½" thick and ½" to 12" wide and long. These strips, together with more finely divided discharge product, were ground to a substantially 40 mesh meal. The meal was then cooled to an acceptable storage temperature (less than 150° F.) and its moisture was adjusted to approximately 12% moisture by spraying water at a controlled rate on the product.

The product discharged from the plant contained no more than 4.5% residual oil on a 12% adjusted moisture basis. Its protein content was 43.5% on a 4.5% residual oil and 12.00% moisture basis.

Samples of the product were submitted to U.S. Dairy Forage Research Center, located in Madison, Wis., and measured for bypass protein according to a procedure described by Broderick, J. Nutr. 108: 181–190, 1978. Available bypass lysine and methionine were measured using standard AOCS procedures for determining availability of these essential amino acids.

The average bypass value of a number of samples submitted was 60 ± 2%. The average value of the available lysine and methionine content of the bypassed sample was 8.4 grams per pound of sample.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

We claim:

1. A method of preparing a high bypass protein product from soybeans, comprising the steps of:
   comminuting raw soybeans to crack open their hulls;
   heating the comminuting soybeans in a high-temperature reactor to elevated temperatures in the range of 235° to 350° F.;
   maintaining the soybeans at the elevated temperatures for 1–60 minutes;
   subsequently partially removing oil contained in the soybeans to leave a high bypass protein cake.

2. A method of preparing a high bypass protein product from soybeans, according to claim 1, further including the step of:
   applying a back pressure having a range of about 50 to 300 PSIG to the soybeans simultaneously with the step of partially removing the oil.

3. A method of preparing a high bypass protein product from soybeans, according to claim 1, further including the step of:
   grinding the high bypass protein cake to a desired range of particle size.

4. A method of preparing a high bypass protein product from soybeans, according to claim 3, wherein the particle size is in the range of roughly 40-80 mesh.

5. A method of preparing a high bypass protein product from soybeans, according to claim further including the steps of:
   discharging the soybeans from the high temperature reactor subsequent to the step of maintaining the soybeans at the elevated temperatures.

6. A method of preparing a high bypass protein product from soybeans, according to claim 5, wherein the soybeans discharged from the reactor have a protein bypass value in the range of 55-65%.

7. A method of treating vegetable products to produce feed for livestock, comprising the steps of:
   heating soybeans in a high-temperature reactor to an elevated temperature in the range of 235° to 350° F.;
   maintaining the soybeans at the elevated temperature for a period of 1 to 60 minutes;
   subsequently discharging the soybeans from the high-temperature reactor, the discharged soybeans having a protein bypass value of 55 to 65%.

8. A method of treating vegetable products to produce feed for livestock, according to claim 7, further comprising the steps of:
   partially removing oil contained in the discharged soybeans to leave a cake having a protein bypass value in the range of 55-65%.

9. A method of treating vegetable products to produce feed for livestock, according to claim 8, wherein the cake includes essential amino acids which have a bypass value in the range of 55-65%.

10. A method of treating vegetable products to produce feed for livestock, according to claim 9, wherein the essential amino acids include lysine and methionine.

11. A method for producing a meal suitable for feeding livestock to improve their growth and/or lactation, comprising the steps of:
   heating soybeans to 235° to 350° F. for 1-60 minutes; and
   subsequently obtaining a meal characterized by the following properties:
      a protein bypass valve of at least 55%,
      a quantity of bypassed lysine and methionine of at least 8.0 grams per pound of meal, and
      a residual oil content of 5-5.5 weight % or less on a bone dry basis.

12. The method of claim 11 wherein the quantity of bypassed lysine and methionine is at least 8.4 grams per pound of meal.

* * * * *

UNITED STATES PATENT AND TRADEMARK OFFICE
CERTIFICATE OF CORRECTION

PATENT NO. : 5,225,230

DATED : July 6, 1993

INVENTOR(S) : Donald W. Seaman, et al.

It is certified that error appears in the above-identified patent and that said Letters Patent is hereby corrected as shown below:

Claim 1, column 12, line 55, after "heating the" delete "comminuting" and substitute therefor --comminuted--.

Claim 5, column 13, line 10, after "according to claim" insert --1,--.

Claim 11, column 14, line 21, delete "valve" and substitute therefor --value--.

Signed and Sealed this

Fifth Day of April, 1994

BRUCE LEHMAN

Attest:

Attesting Officer

Commissioner of Patents and Trademarks